US009953199B2

United States Patent
Kwan et al.

(10) Patent No.: US 9,953,199 B2
(45) Date of Patent: Apr. 24, 2018

(54) DECODING A MAIN IMAGE USING AN AUXILIARY IMAGE

(71) Applicant: Hewlett-Packard Development Company, L.P., Houston, TX (US)

(72) Inventors: Sabrina Kwan, San Diego, CA (US); Pam Lennan, San Diego, CA (US); Steve Say, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/120,454

(22) PCT Filed: Feb. 24, 2014

(86) PCT No.: PCT/US2014/018062
§ 371 (c)(1),
(2) Date: Aug. 19, 2016

(87) PCT Pub. No.: WO2015/126426
PCT Pub. Date: Aug. 27, 2015

(65) Prior Publication Data
US 2017/0169269 A1 Jun. 15, 2017

(51) Int. Cl.
*G06F 17/00* (2006.01)
*G06K 7/14* (2006.01)
(Continued)

(52) U.S. Cl.
CPC ..... *G06K 7/1447* (2013.01); *G06F 17/30256* (2013.01); *G06F 17/30879* (2013.01);
(Continued)

(58) Field of Classification Search
CPC . G06Q 30/02; G06F 17/30879; G07F 7/1008; G06K 19/06037; G06K 7/14;
(Continued)

(56) References Cited

U.S. PATENT DOCUMENTS 7,273,169 B2 * 9/2007 De Jong ............... G06K 19/10
235/375
7,444,000 B2 10/2008 Rhoads
(Continued)

FOREIGN PATENT DOCUMENTS

| CN | 1691087 A | 11/2005 |
|---|---|---|
| WO | WO-2012081803 A1 | 6/2012 |
| WO | WO-2012169813 A2 | 12/2012 |

OTHER PUBLICATIONS

Chiang, J-C. et al., "Bit-depth Scalable Video Coding with New Inter-layer Prediction," (Research Paper), Jul. 18, 2011, 19 pages, http://asp.euraipjournals.com.
(Continued)

*Primary Examiner* — Karl D Frech
(74) *Attorney, Agent, or Firm* — HP Inc. Patent Department

(57) ABSTRACT

Example implementations relate to using an auxiliary image to identify an image analysis mechanism associated with a main image. For example, a computing device may include a processor and an image capture device. The processor may capture with the image capture device a representation of a combined image. The combined image may include a main image and an auxiliary image. The processor may also identify the auxiliary image in the representation of the combined image and decode the identified auxiliary image via an auxiliary image decoding mechanism to determine image analysis mechanism identification information associated with the main image. The processor may further determine, based on the image analysis mechanism identification information, a main image analysis mechanism useable to determine an identifier associated with the main image. The auxiliary image decoding mechanism is different than the main image analysis mechanism.

15 Claims, 6 Drawing Sheets

(51) Int. Cl.
   *G06K 9/46*   (2006.01)
   *G06K 19/06*  (2006.01)
   *G06F 17/30*  (2006.01)

(52) U.S. Cl.
   CPC ......... *G06K 7/1413* (2013.01); *G06K 9/4604* (2013.01); *G06K 19/06028* (2013.01)

(58) Field of Classification Search
   CPC .. G06K 7/1447; G06K 7/1413; G06K 9/4604; G06K 19/06028
   USPC ...................... 235/375, 494, 382, 382.5, 379
   See application file for complete search history.

(56) References Cited

U.S. PATENT DOCUMENTS

| | | | |
|---|---|---|---|
| 7,830,535 B2 | 11/2010 | Komatsubara | |
| 8,571,256 B2 | 10/2013 | Tourapis et al. | |
| 8,843,382 B2* | 9/2014 | Kim | G06Q 10/10 705/2 |
| 9,208,384 B2* | 12/2015 | Conwell | G06F 17/30265 |
| 9,239,978 B2* | 1/2016 | Friedman | G06K 19/06103 |
| 9,565,175 B1* | 2/2017 | Saylor | G06F 21/10 |
| 9,588,654 B2* | 3/2017 | Satow | G06F 3/0484 |
| 2002/0055957 A1 | 5/2002 | Ohsawa | |
| 2002/0102966 A1 | 8/2002 | Lev et al. | |
| 2005/0015370 A1 | 1/2005 | Stavely et al. | |
| 2008/0162450 A1 | 7/2008 | McIntyre et al. | |
| 2008/0181305 A1 | 7/2008 | Cho et al. | |
| 2009/0006471 A1 | 1/2009 | Richardson et al. | |
| 2011/0150292 A1 | 6/2011 | Boncyk et al. | |
| 2012/0045089 A1 | 2/2012 | Ramos et al. | |
| 2013/0169838 A1 | 7/2013 | Rodriguez et al. | |
| 2013/0233916 A1 | 9/2013 | Tran | |

OTHER PUBLICATIONS

Wikipedia, "QR code," Jan. 25, 2014, 17 pages, available at http://en.wikipedia.org/wiki/Qr_code.

* cited by examiner

DECODING A MAIN IMAGE USING AN AUXILIARY IMAGE

BACKGROUND

An augmented reality (AR) application may overlay content, such as interactive graphics, a video, an image, etc., over a view of a physical object or a physical environment through a display device. For example, a picture of car that is manipulated by an AR application may display a link to a car manufacturer's website when the picture of the car is displayed subsequently on a display of a smartphone.

BRIEF DESCRIPTION OF THE DRAWINGS

Some examples of the present application are described with respect to the following figures.

DETAILED DESCRIPTION

Figure 1:
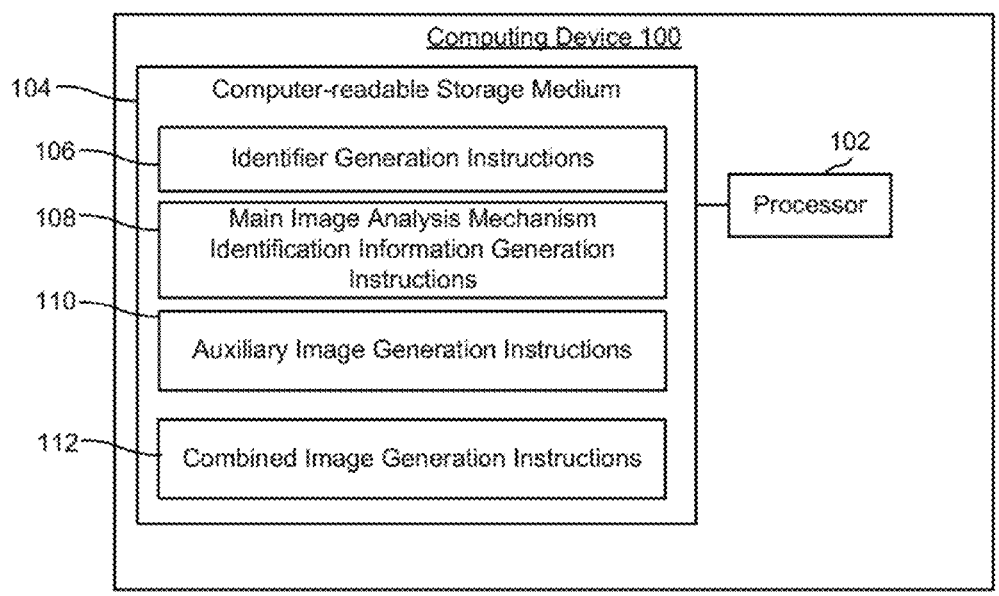
FIG. 1 is a block diagram of an example computing device for encoding image analysis mechanism identification information in an auxiliary image to identify a main image analysis mechanism usable to determine an identifier associated with a main image.

As described above, an augmented reality (AR) application may overlay content over a view of a physical object or a physical environment. For example, an AR application may be a software application (e.g., computer executable instructions) that causes a computing device to display supplemental or additional information at least partially over or at least partially in place of a scene that is captured by an image capture device and displayed on a display of the computing device. Currently, many different AR applications may be used to generate AR related content, such as an overlay of a video in an image of a physical object or a physical environment. To determine whether an image is associated with AR related content by generated a particular AP application, an AR image viewing application may attempt to analyze the image and/or the video capture through a trial and error process. For example, the AR image viewing application may attempt to analyze the image and/or the video capture by cycling through different AR applications.

Accordingly, computing resources, such as central processing unit (CPU) cycles, may be wasted when the AR image viewing application chooses a wrong AR application. Thus, computing resource consumption may be increased compared to analyzing the image and/or the video capture using a correct AR application without cycling through different AR applications.

Examples described herein address the above challenges by providing an auxiliary image encoded with identification information of an image analysis mechanism usable to retrieve content associated with the image, such as AR content. For example, a first computing device, such as a server, a laptop computer, a tablet computer, or a smartphone, may generate an identifier of a main image using a main image analysis mechanism. The identifier may be associated with linked content, such as an overlay of a link to a website, that is stored in a database.

The first computing device may also generate image analysis mechanism identification information that is usable to identify the main image analysis mechanism. The first computing device may further generate an auxiliary image that is independent of the main image. The auxiliary image may include a first characteristic and a second characteristic. The first characteristic may be usable to identify the auxiliary image. The image analysis mechanism identification information may be encoded in the second characteristic in accordance with an auxiliary image encoding mechanism different than the main image analysis mechanism. The first computing device may further generate a combined image including the main image and the auxiliary image.

Subsequently, at a second computing device, an image capture device of the second computing device may capture a representation of the combined image. The second computing device may identify the auxiliary image in the representation of the combined image based on the first characteristic and decode the second characteristic via an auxiliary image decoding mechanism to determine image analysis mechanism identification information associated with the main image. The second computing device may determine, based on the image analysis mechanism identification information, a main image analysis mechanism useable to determine an identifier associated with the main image. In this manner, examples described herein may reduce computing resources consumption associated with identifying an image analysis mechanism associated with an image.

Referring now to the figures, FIG. 1 is a block diagram of an example computing device 100 for encoding image analysis mechanism identification information in an auxiliary image to identify a main image analysis mechanism usable to determine an identifier associated with a main image. Computing device 100 may be, for example, a web-based server, a local area network server, a cloud-based server, a notebook computer, a desktop computer, an all-in-one system, a tablet computing device, a smartphone phone, or any other electronic device suitable for encoding information in an image. Computing device 100 may include a processor 102 and a computer-readable storage medium 104.

Processor 102 may be a central processing unit (CPU), a semiconductor-based microprocessor, and/or other hardware devices suitable for retrieval and execution of instructions stored in computer-readable storage medium 104. Processor 102 may fetch, decode, and execute instructions 106, 108, 110, and 112 to control a process of encoding identification information in an auxiliary image to identify a decoding mechanism usable to determine linked content information encoded in a main image. As an alternative or in addition to retrieving and executing instructions, processor 102 may include at least one electronic circuit that includes electronic components for performing the functionality of instructions 106, 108, 110, 112, or a combination thereof.

Computer-readable storage medium 104 may be any electronic, magnetic, optical, or other physical storage device that contains or stores executable instructions. Thus, computer-readable storage medium 104 may be, for example, Random Access Memory (RAM), an Electrically Erasable Programmable Read-Only Memory (EEPROM), a storage device, an optical disc, etc. In some examples, computer-readable storage medium 104 may be a non-transitory storage medium, where the term "non-transitory" does not encompass transitory propagating signals. As described in detail below, computer-readable storage medium 104 may be encoded with a series of processor executable instructions 106, 108, 110, and 112 for encoding linked content information, generating main image analysis mechanism identification information, encoding the main image analysis mechanism identification information, and generating a combined image.

Identifier generation instructions 106 may generate an identifier of a main image. As used herein, an identifier may be any information suitable to identify an image. As used herein, a main image may be a photograph, a frame of a video capture, or any graphical representations of a physical object or a physical environment selected based on user input.

In some examples, computing device 100 may receive the main image from an image capture device, such as a camera. In some examples, computing device 100 may receive the main image from another computing device, such as a laptop computer or a smartphone. In some examples, the identifier may be a hash value that corresponds to the main image.

Identifier generation instructions 106 may generate the identifier of the main image by using a main image analysis mechanism. For example, the main image analysis mechanism may be implemented by a software application (e.g., computer executable instructions) that extracts unique information of the main image and generates an identifier of the main image based on the unique information. The unique information may be extracted using a plurality of image analysis techniques, such as edge detection, image segmentation, pattern recognition, etc. As an example, the main image analysis mechanism may be implemented by Aurasma®. Aurasma® is a registered trademark of Autonomy Corporation PLC, which is headquartered in Berkshire, UK. It should be understood that the main image analysis mechanism may be implemented by other software applications that associate an image with additional information, such as a digital watermarking software application, a software application that embeds additional information into an image.

In some examples, identifier generation instructions 106 may select the main image based on user input. Identifier generation instructions 106 may select the main image analysis mechanism from a plurality of image analysis mechanisms accessible to identifier generation instructions 106. In some examples, a single image analysis mechanism may be accessible to identifier generation instructions 106.

Main image analysis mechanism identification information generation instructions 108 may generate main image analysis mechanism identification information associated with a main image analysis mechanism selected by identifier generation instructions 106. Main image analysis mechanism identification information may be any information suitable to indicate an identity of a particular image analysis mechanism. As an example, main image analysis mechanism identification information may be a name of a particular application. As another example, main image analysis mechanism identification information may be an identifier of a particular application.

Auxiliary image generation instructions 110 may receive the main image analysis mechanism identification information from main image analysis mechanism identification information generation instructions 108. Auxiliary image generation instructions 110 may generate an auxiliary image and encode the main image analysis mechanism identification information into the auxiliary image using an auxiliary image encoding mechanism. To encode the main image analysis mechanism identification information into the auxiliary image, the auxiliary image encoding mechanism may be implemented by a software application that converts data corresponding to the auxiliary image into different components, such as high frequency components and low frequency components, by using a transform function. For example, the auxiliary image encoding mechanism may use discrete cosine transformation (DCT) to convert content of the auxiliary image. The auxiliary image encoding mechanism may add data corresponding to the main image analysis mechanism identification information to at least some of the different components.

The auxiliary image encoding mechanism may combine the different components with embedded data corresponding to the main image analysis mechanism identification information to form the auxiliary image embedded with main image analysis mechanism identification information. For example, the auxiliary image encoding mechanism may use an inverse DCT to combine the different components with embedded data corresponding to the main image analysis mechanism identification information. In some examples, the auxiliary image encoding mechanism may use other techniques, such as quantization index modulation, to encode the main image analysis mechanism identification information to the auxiliary image.

In some examples, an auxiliary image may be a particular image that is independent of the main image. As used herein, an auxiliary image that is independent of a main image may mean that the auxiliary image may be generated without using or relying upon any part of the main image, the auxiliary image may not be a part of the main image, the auxiliary image may not overlap with the main image when displayed on a medium, such as a display of a computing device, a piece of paper, etc., or the auxiliary image may not be an image that is identical with the main image, or a combination thereof.

In some examples, an auxiliary image may be different from the main image. For example, the main image may be a visual representation of a first object, such as a person and the auxiliary image may be a visual representation of a second object different from the first object, such as a car. In some examples, auxiliary image generation instructions 110 may select the auxiliary image from an auxiliary image database having a plurality of candidate auxiliary images based on user input. Each candidate auxiliary image may include a first characteristic usable to identify a corresponding candidate auxiliary image. Each candidate auxiliary image may also include a second characteristic usable to store encoded information. As used herein, a characteristic of an image may be an aspect of the image that is inherent to the image and that is not part of other images. The characteristic may be used to distinguish the image from the other images. For example, a characteristic of an image may be an aspect ratio of the image, but not a location of the image relative to another image.

In some examples, the auxiliary image may be a designated image, such as an image of an object, a watermarked image, an image of texts, etc. The first characteristic may be a geometric shape of the designated image and the second characteristic may be content of the designated image. As another example, the first characteristic may be an aspect ratio of the designated image and the second characteristic may be the visual representation of the designated image. As another example, the first characteristic may be a first part of the designated image having a first resolution (e.g., an amount of information that may be embedded into the first part) and the second characteristic may be a second part of the designated image having a second resolution (e.g., an amount of information that may be embedded into the second part). The second resolution may be higher than the first resolution. For example, the first part may correspond to a white background of the designated image and the second part may correspond to an object of the designated image. Because the object may include more detail, such as the amount of colors, than the white background, the auxiliary image encoding mechanism may determine that the object has a higher resolution than the white background and more information can be embedded into the object than the white background.

As another example, the auxiliary image may be a type of a matrix barcode code and the first characteristic may be a first portion of the matrix barcode usable to identify the matrix barcode and the second characteristic may be a data portion of the matrix code. For example, the matrix barcode may be a QR Code®. QR Code® is registered trademark of DENSO WAVE INCORPORATED, which is headquartered in Chita-gun Aichi, Japan. The first characteristic may be a first portion of the QR Code®, such as a portion of the QR Code® that contains version information of the QR Code®, a portion of the QR Code® that contains layout information of the QR Code®. The second characteristic may be a second portion of the QR Code®, such as a portion of QR Code® that contains content and/or data of the QR Code®. As another example, the auxiliary image may be a border of the combined image. The first characteristic may be a shape or pattern of the border. The second characteristic may be visual representation of the border.

Combined image generation instructions 112 may use the main image and the auxiliary image to generate a combined image. As used herein, a combined image may be any image having a first image and a second image. The first image may be different from the second image. The first image may be generated independent of the second image. For example, the first image may be generated without using or relying upon any part of the main image. As another example, the first image may not be a part of the second image. As another example, the first image may not overlap with the second image when displayed on a medium, such as a display of a computing device, a piece of paper, etc. As another example, the first image may not be an image that is identical to the second image.

Figure 2:
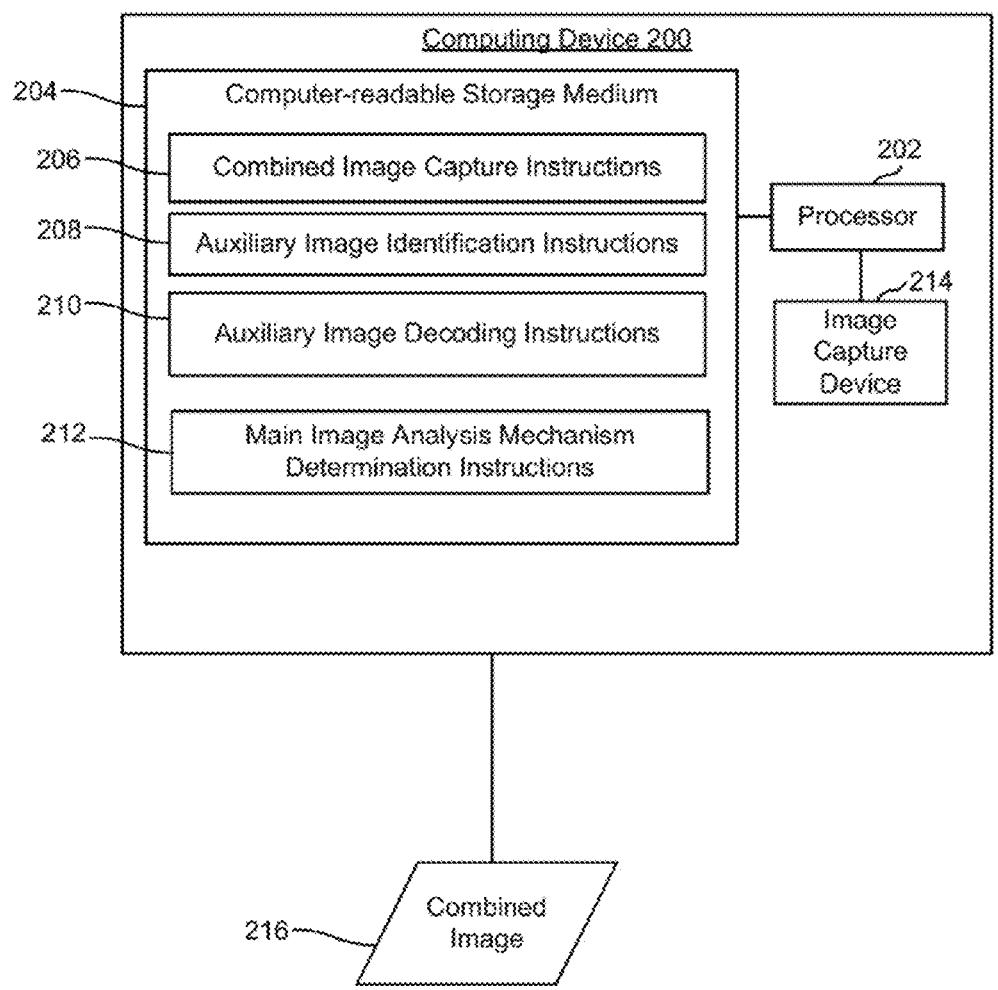
FIG. 2 is a block diagram of an example computing device for decoding an auxiliary image to determine a main image analysis mechanism associated with a main image.

FIG. 2 is a block diagram of an example computing device 200 for decoding an auxiliary image to determine a main image analysis mechanism associated with a main image. As with computing device 100 of FIG. 1, computing device 200 may be any electronic device suitable for decoding a first image to determine a decoding mechanism of another image. Computing device 200 may include a processor 202 and a computer-readable storage medium 204. Processor 202 may be similar to processor 102 of FIG. 1 and computer-readable storage medium 204 may be similar to computer-readable storage medium 104. Computer-readable storage medium 204 may be encoded with a series of processor executable instructions As described in more detail below, computer-readable storage medium 204 may be encoded with a series of processor executable instructions 206-212 for capturing a representation of a combined image, identifying an auxiliary image, decoding the auxiliary image, and decoding a main image. Combined image capture instructions 206 may capture a representation of a combined image 216 via an image capture device 214 of computing device 200. For example, image capture device 214 may be a camera, a scanner, or any device suitable to generate a representation of an image. Combined image 216 may include a main image and an auxiliary image. An example of combined image 216 is described in more detail in FIG. 5.

Auxiliary image identification instructions 208 may analyze the representation of the combined image to identify the auxiliary image based on the first characteristic of the auxiliary image. For example, the auxiliary image may be a particular image that is different from the main image. Auxiliary image identification instructions 208 may identify a geometric shape and/or aspect ratio of the auxiliary image and a geometric shape and/or aspect ratio of the main image. The respective geometric shapes and/or aspect ratios may be compared to entries in the auxiliary image database. When a particular entry in the auxiliary image database matches one of the geometric shapes and/or the aspect ratios, auxiliary image identification instructions 208 may determine that the image having the matching geometric shape and/or aspect ratio is a recognized auxiliary image. For example, auxiliary image identification instructions 208 may determine that the auxiliary image is a recognized auxiliary image.

In some examples, when the first characteristic is a first part of the auxiliary image having a first resolution (e.g., a first amount of information that can be embedded into the first part) and the second characteristic is a second part of the auxiliary image having a second resolution (e.g., a second amount of information that can be embedded into the second part), auxiliary image identification instructions 208 may analyze an image to determine resolutions of different parts of the image. Auxiliary image identification instructions 208 may determine that the image is a recognized auxiliary image when the first resolution matching a resolution of a part of the image.

In some examples, the auxiliary image may be a matrix barcode (e.g., a QR Code®) and the main image is an image other than a matrix barcode. Auxiliary image identification instructions 208 may analyze the main image and the auxiliary image to identify a particular portion of the matrix barcode usable to identify the matrix barcode as a matrix barcode (e.g., QR Code®). For example, a portion of the matrix barcode (e.g., QR Code®) that contains version information of the matrix barcode may be used for the identification. When auxiliary image identification instructions 208 identifies an image from the representation of the combined image having the particular version information by comparing to entries in the auxiliary image database, auxiliary image identification instructions 208 may determine that the image is a recognized auxiliary image.

Auxiliary image decoding instructions 210 may decode the second characteristic of the auxiliary image using an auxiliary image decoding mechanism. Auxiliary image decoding instructions 210 may identify the auxiliary image decoding mechanism based on an entry in the auxiliary image database that matches the first characteristic. Auxiliary image decoding instructions 210 may decode the second characteristic to determine the main image analysis mechanism identification information associated with the main image analysis mechanism. The auxiliary image decoding mechanism may have a first processing parameter that corresponds to a first quantity of computing resources to be utilized to decode an image. For example, a quantity of computing resources may be a number of central processing unit (CPU) cycles to be utilized to decode an image, an amount of storage to be utilized to decode an image, a number of input/output operations to be utilized to decode an image, or the like.

Main image analysis mechanism determination instructions 212 may determine the main image analysis mechanism based on the main image analysis mechanism identification information. Main image analysis mechanism determination instructions 212 may analyze the main image using the main image decoding mechanism to determine the identifier associated with the main image. The main image decoding mechanism may have a second processing parameter that corresponds to a second quantity of computing resources to be utilized to analyze an image. The second processing parameter may be higher than the first processing parameter.

Figure 3:
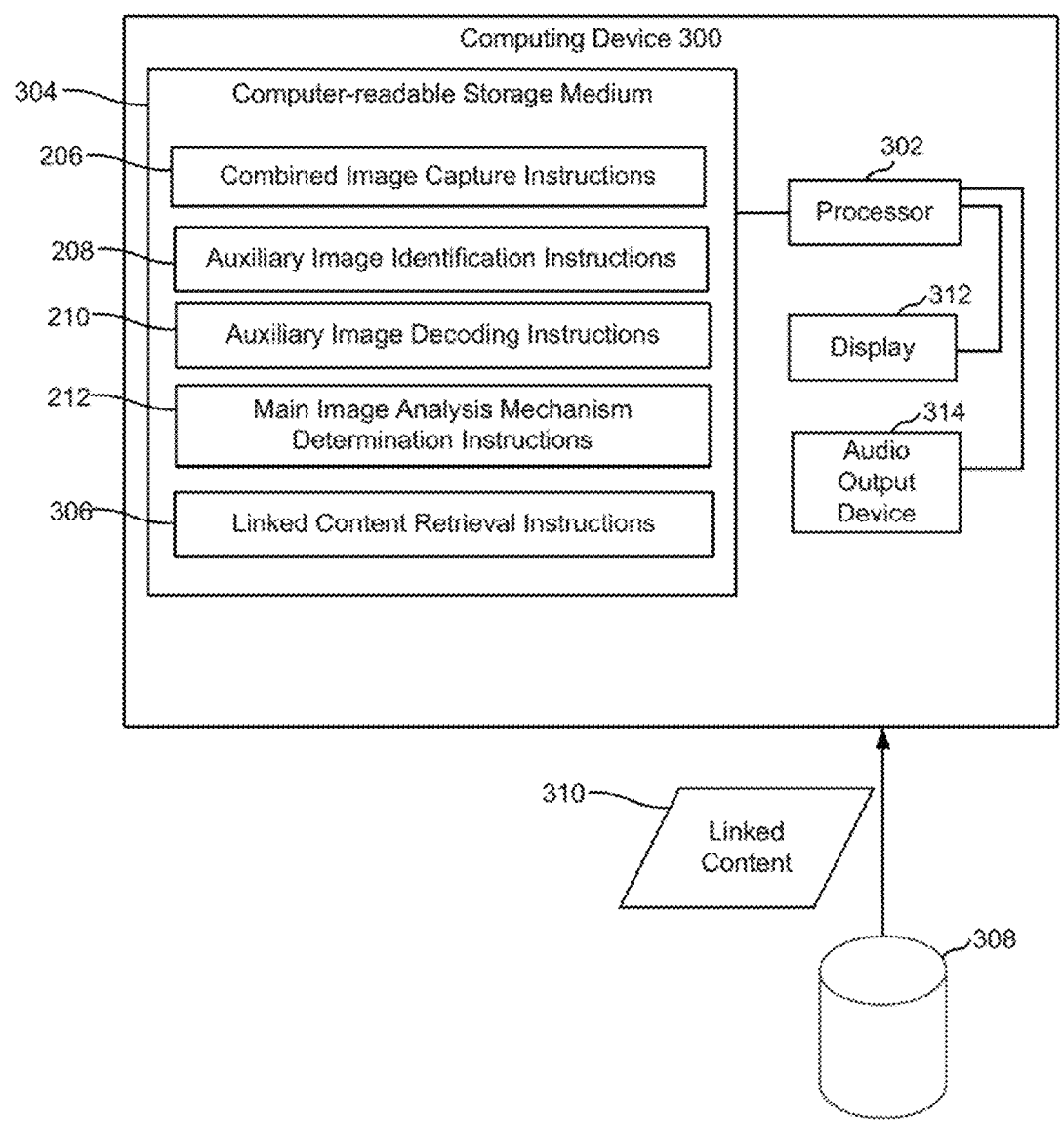
FIG. 3 is a block diagram of another example computing device for decoding the auxiliary image to determine a main image analysis mechanism associated with a main image.

FIG. 3 is a block diagram of another example computing device 300 for decoding the auxiliary image to determine a main image analysis mechanism associated with a main image. As with computing device 200 of FIG. 2, computing device 300 may be any electronic device suitable for decoding a first image to determine a decoding mechanism of another image. Computing device 300 may include a processor 302 and a computer-readable storage medium 304. Processor 302 may be similar to processor 202 and computer-readable storage medium 304 may be similar to computer-readable storage medium 204. Computer-readable storage medium 304 may be encoded with a series of processor executable instructions.

Computer-readable storage medium 304 may include instructions 206-212 of FIG. 2 and linked content retrieval instructions 306. After the identifier associated with the main image is determined by main image analysis mechanism determination instructions 212, linked content retrieval instructions 306 may access a database 308 to retrieve linked content 310 associated with the identifier. The identifier may be used to identify linked content 310. Linked content retrieval instructions 306 may output linked content 310 via a display 312 of computing device 300 and/or an audio output device 314 of computing device 300. In some examples, linked content 310 may be video content associated with the main image. In some examples, linked content 310 may be audio content associated with the main image. In some examples, linked content 310 may be multimedia content having audio content and video content.

Figure 4:
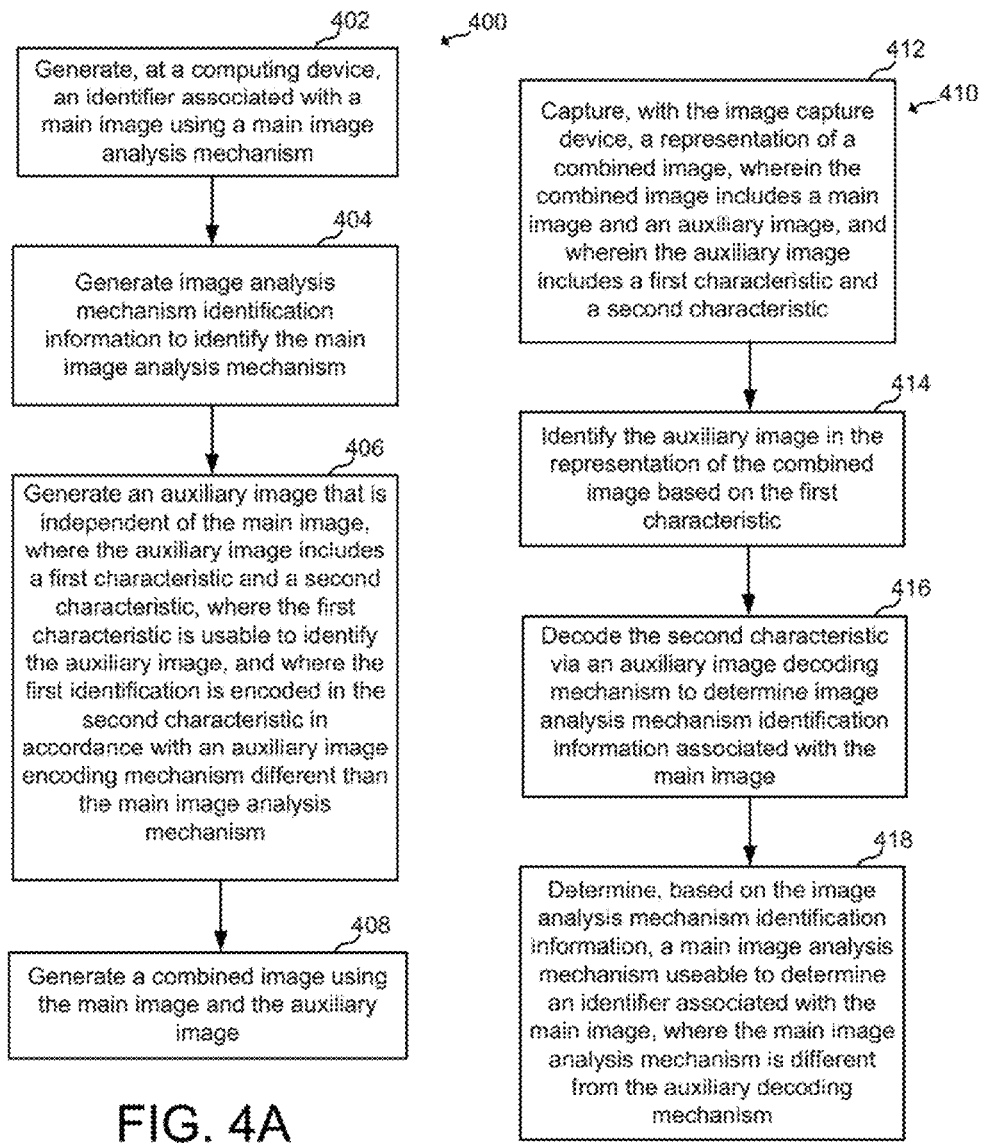
FIG. 4A is an example of a flowchart illustrating a method of encoding identification information in an auxiliary image to identify a main image analysis mechanism associated with a main image.
FIG. 4B is an example of a flowchart illustrating a method of decoding the auxiliary image to determine the main image analysis mechanism.

FIG. 4A is an example of a flowchart illustrating a method 400 of encoding identification information in an auxiliary image to identify a main image analysis mechanism associated with a main image. Method 400 includes generating, at a computing device, an identifier associated with a main image using a main image analysis mechanism, at 402. For example, referring to FIG. 1, identifier generation instructions 106 may generate an identifier associated with a main image.

Method 400 also includes generating image analysis mechanism identification information to identify the main image analysis mechanism, at 404. For example, referring to FIG. 1, main image analysis mechanism identification information generation instructions 108 may generate main image analysis mechanism identification information associated with a main image analysis mechanism selected by identifier generation instructions 106.

Method 400 further includes generating an auxiliary image that is independent of the main image, where the auxiliary image includes a first characteristic and a second characteristic, where the first characteristic is usable to identify the auxiliary image, and where the main image analysis mechanism identification information is encoded in the second characteristic in accordance with an auxiliary image encoding mechanism different than the main image analysis mechanism, at 406. For example, referring to FIG. 1, auxiliary image generation instructions 110 may generate an auxiliary image and encode the main image analysis mechanism identification information into the auxiliary image using an auxiliary image encoding mechanism.

Method 400 further includes generating a combined image including the main image and the auxiliary image, at 408. For example, referring to FIG. 1, combined image generation instructions 112 may use the main image and the auxiliary image to generate a combined image.

FIG. 4B is an example of a flowchart illustrating a method 410 of decoding the auxiliary image to determine the decoding mechanism. Method 410 includes capturing, with an image capture device of the computing device, a representation of a combined image, where the combined image includes a main image and an auxiliary image, and where the auxiliary image includes a first characteristic and a second characteristic, at 412. For example, referring to FIG. 2, combined image capture instructions 206 may capture a representation of a combined image 216 via an image capture device 214 of computing device 200.

Method 410 also includes identifying the auxiliary image in the representation of the combined image based on the first characteristic, at 414. For example, referring to FIG. 2, auxiliary image identification instructions 208 may analyze the representation of the combined image to identify the auxiliary image based on the first characteristic of the auxiliary image.

Method 410 further includes decoding the second characteristic via an auxiliary image decoding mechanism to determine image analysis mechanism identification information associated with the main image, at 416. For example, referring to FIG. 2, auxiliary image decoding instructions 210 may decode the second characteristic of the auxiliary image using an auxiliary image decoding mechanism.

Method 410 further includes determining, based on the image analysis mechanism identification information, a main image analysis mechanism useable to determine an identifier associated with the main image, where the main image analysis mechanism is different from the auxiliary decoding mechanism, at 418. For example, referring to FIG. 2, main image analysis mechanism determination instructions 212 may determine the main image analysis mechanism based on the main image analysis mechanism identification information.

Figure 5:
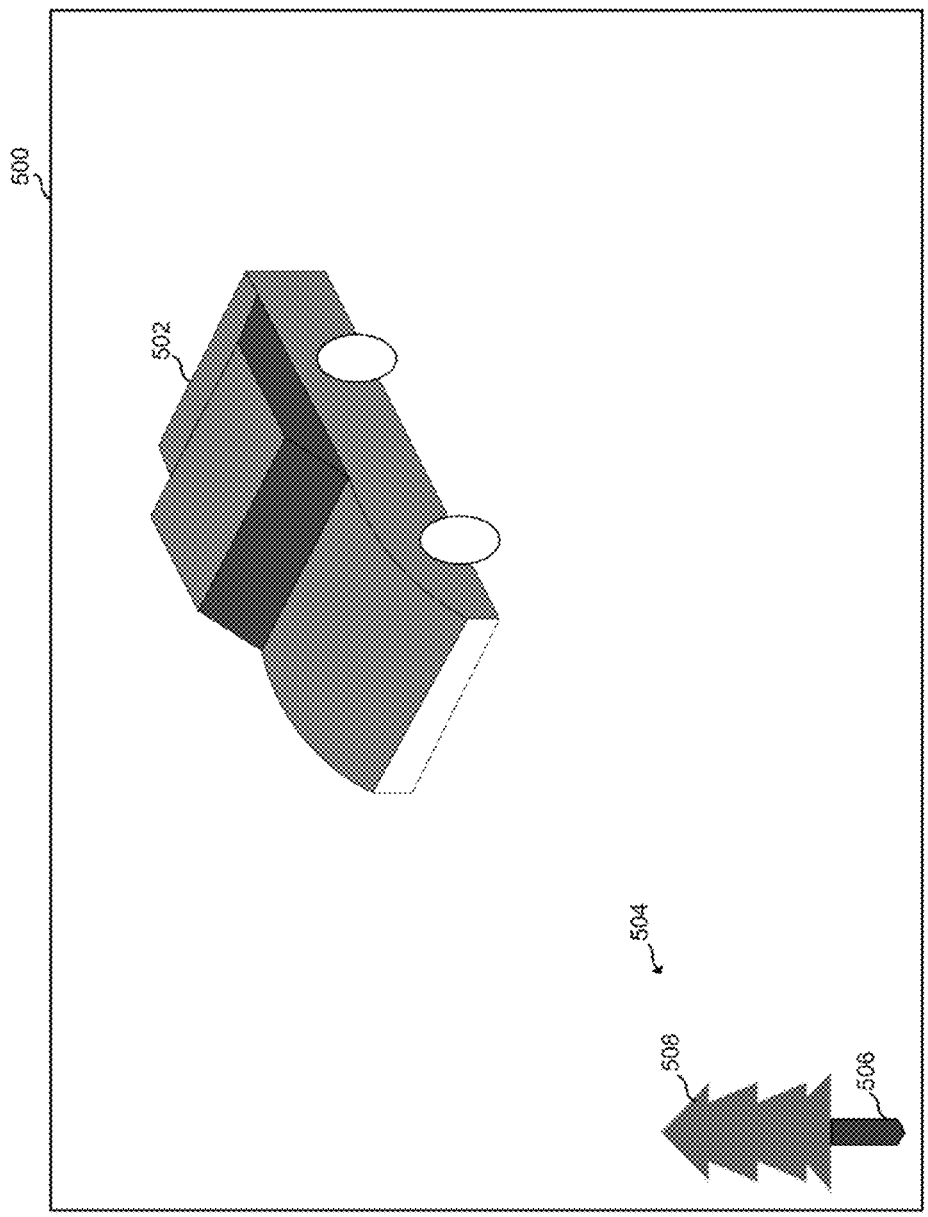
FIG. 5 is an example of a combined image having a main image and an auxiliary image where image analysis mechanism identification information of a main image analysis mechanism associated with a main image is encoded in the auxiliary image.

FIG. 5 is an example of a combined image 500 having a main image 502 and an auxiliary image 504 where image analysis mechanism identification information of a main image analysis mechanism associated with a main image is encoded in the auxiliary image. Combined image 500 may be generated by computing device 100 of FIG. 1. Main image 502 may be an image that is generated by a user via an image capture device, such as a camera. Auxiliary image 504 may be an image selected by auxiliary image generation instructions 110 from the auxiliary image database based on user input.

In some examples, auxiliary image 504 may include a first characteristic that corresponds to a geometric shape of auxiliary image 504, such as a tree shape. In some examples, the first characteristic may correspond to an aspect ratio of auxiliary image 504. In some examples, the first characteristic may correspond to a first part 506 of auxiliary image 504 that has a first resolution that corresponds to a first amount of information that can be embedded into first part 506. Auxiliary image 504 may include a second characteristic where main image analysis mechanism identification information associated with main image 502 is encoded. In some examples, the second character may correspond to a second part 508 of auxiliary image 504 that has a second resolution that corresponds to a second amount of information that can be embedded into second part 508. The second resolution may be higher than the first resolution. The first characteristic and the second characteristic may be generated upon generation of the auxiliary image 504.

Figure 6:
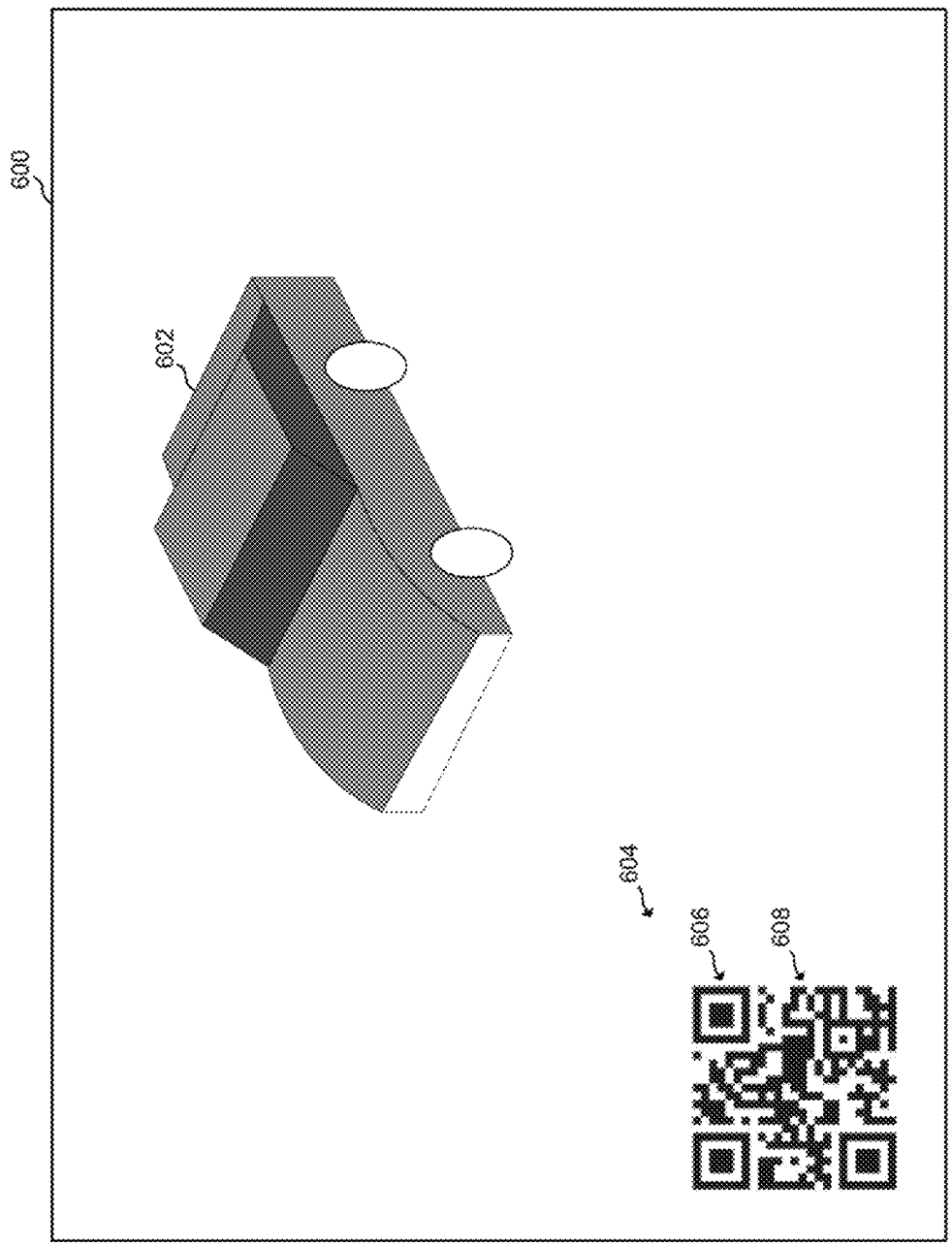
FIG. 6 is another example of a combined image.

FIG. 6 is another example of a combined image 600. Combined image 600 may include a main image 602 and an auxiliary image 604 where the main image analysis mechanism identification information associated with main image 602 is encoded in auxiliary image 604. Combined image 600 may be generated by computing device 100 of FIG. 1. Main image 602 may be an image that is generated by a user via an image capture device, such as a camera. Auxiliary image 604 may be a QR Code®.

Auxiliary image 604 may include a first characteristic that corresponds to a first pattern 606 of auxiliary image 604. For example, first pattern 606 may be used to indicate version information of a QR Code®. Auxiliary image 604 may also include a second characteristic that corresponds to a second pattern 608 of auxiliary image 604. Second pattern 608 may be a data portion of a QR Code®.

The use of "comprising", "including" or "having" are synonymous and variations thereof herein are meant to be inclusive or open-ended and do not exclude additional unrecited elements or method steps.

What is claimed is:

1. A computer-readable storage medium comprising instructions that when executed cause a processor of a computing device to:
   capture, with an image capture device of the computing device, a representation of a combined image, wherein the combined image includes a main image and an auxiliary image;
   identify a first characteristic of the auxiliary image, wherein the auxiliary image comprises the first characteristic and a second characteristic;
   identify the auxiliary image in the representation of the combined image based on the first characteristic;
   in response to a determination that a particular entry in an auxiliary image database matches the identified first characteristic, determine that the auxiliary image is a recognized auxiliary image;
   decode the second characteristic via an auxiliary image decoding mechanism to determine image analysis mechanism identification information associated with the main image; and
   determine, based on the image analysis mechanism identification information, a main image analysis mechanism useable to determine an identifier associated with the main image, wherein the main image analysis mechanism is different from the auxiliary decoding mechanism.

2. The computer-readable storage medium of claim 1, wherein the instructions when executed further cause the processor to access a database to retrieve linked content associated with the main image based on the identifier.

3. The computer-readable storage medium of claim 1, wherein the identifier is generated using the main image analysis mechanism.

4. The computer-readable storage medium of claim 1, wherein the first characteristic includes a geometric shape of the auxiliary image.

5. The computer-readable storage medium of claim 1, wherein the auxiliary image is independent of the main image.

6. A computing device comprising:
   an image capture device; and
   a processor to:
      capture, with the image capture device, a representation of a combined image, wherein the combined image includes a main image and an auxiliary image, and wherein the auxiliary image is independent of the main image;
      identify a first characteristic of the auxiliary image, wherein the auxiliary image comprises the first characteristic and a second characteristic;
      identify the auxiliary image in the representation of the combined image based on the first characteristic of the auxiliary image;
      decode a second characteristic of the identified auxiliary image via an auxiliary image decoding mechanism to determine image analysis mechanism identification information associated with the main image, wherein the second characteristic is different than the first characteristic;
      determine, based on the image analysis mechanism identification information, a main image analysis mechanism useable to determine an identifier associated with the main image, wherein the auxiliary image decoding mechanism is different from the main image analysis mechanism; and
      determine whether an entry in an auxiliary image database matches the identified first characteristic.

7. The computing device of claim 6, wherein the auxiliary image includes a matrix barcode.

8. The computing device of claim 6, wherein the processor further to access a database to retrieve linked content associated with the main image based on the identifier.

9. The computing device of claim 8, further comprising a display, wherein the processor is further to activate the linked content by displaying the linked content on the display.

10. The computing device of claim 6, wherein the identifier to identify multimedia content that is associated with the main image.

11. The computing device of claim 6, wherein the auxiliary image decoding mechanism has a first processing parameter, and wherein the main image analysis mechanism has a second processing parameter that is higher than the first processing parameter.

12. The computing device of claim 6, wherein the identifier is generated using the main image analysis mechanism.

13. A method comprising:
   generating, at a computing device, an identifier associated with a main image using a main image analysis mechanism;
   generating image analysis mechanism identification information to identify the main image analysis mechanism;
   generating an auxiliary image that is independent of the main image, wherein the auxiliary image includes a first characteristic and a second characteristic, wherein the first characteristic is usable to identify the auxiliary image in an auxiliary image database according to the first characteristic, and wherein the image analysis mechanism identification information is encoded in the second characteristic in accordance with an auxiliary image encoding mechanism different than the main image analysis mechanism; and generating a combined image including the main image and the auxiliary image.

14. The method of claim 13, further comprising storing linked content associated with the main image in a database based on the identifier.

15. The method of claim 14, wherein the linked content includes video content associated with the main image.

* * * * *